United States Patent
Keukens

(10) Patent No.: US 10,862,519 B1
(45) Date of Patent: Dec. 8, 2020

(54) BANDWIDTH CONTROL IN RADIO FREQUENCY BROADCAST SIGNALS RELATIVE TO ADJACENT-CHANNEL SIGNAL PROPERTIES

(71) Applicant: NXP B.V., Eindhoven (NL)

(72) Inventor: Erik Keukens, Eindhoven (NL)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 16/855,741

(22) Filed: Apr. 22, 2020

(51) Int. Cl.
*H04B 1/10* (2006.01)
*H04H 40/18* (2008.01)

(52) U.S. Cl.
CPC ............ *H04B 1/1036* (2013.01); *H04H 40/18* (2013.01); *H04B 2001/1045* (2013.01); *H04B 2001/1054* (2013.01); *H04B 2001/1072* (2013.01)

(58) Field of Classification Search
CPC ...... H04B 1/10; H04B 1/1027; H04B 1/1036; H04B 2001/1045; H04B 2001/1054; H04B 2001/1072; H04H 40/18
See application file for complete search history.

(56) References Cited

U.S. PATENT DOCUMENTS

| | | | | |
|---|---|---|---|---|
| 6,389,273 | B1 * | 5/2002 | Brandenburg | ....... H04B 1/1036 455/296 |
| 2009/0247099 | A1 * | 10/2009 | Jaisimha | ............. H04B 1/1638 455/161.2 |
| 2010/0130152 | A1 * | 5/2010 | Whikehart | ........... H04B 1/1036 455/226.2 |
| 2015/0365750 | A1 * | 12/2015 | Sun | ......................... H04R 1/08 381/122 |

OTHER PUBLICATIONS

U.S. Appl. No. 16/804,358, filed Feb. 28, 2020, entitled: Adjacent Channel Suppression Based on Adjacent Channel Properties in FM Radio Broadcast Receivers. The Examiner is referred to the copending patent prosecution of the common Applicant (no attachment).
U.S. Appl. No. 16/804,391, filed Feb. 28, 2020, entitled: FM Spectrum Estimation Relative to Adjacent Channel. The Examiner is referred to the copending patent prosecution of the common Applicant (no attachment).

(Continued)

*Primary Examiner* — Nguyen T Vo
(74) *Attorney, Agent, or Firm* — Rajeev Madnawat

(57) ABSTRACT

Exemplary aspects are directed to FM-radio circuitries and systems in which, at the receiving end of a broadcast transmission, circuitry is used set the bandwidth and band position for receiving the desired channel of the broadcast signal based on measured signal properties of immediately-adjacent channel(s). The adjustments to the received channel include bandwidth selection and offset frequency adjustment. These adjustments are, in part, based on USN signal levels as well as modulation symmetry detection which are affected by the modulation level of the desired and other channel(s). Signal processing circuitry such as logic/CPU circuitry, then receives the desired channel, including information carried by the broadcast signal, in response to setting the bandwidth based on the measured signal properties.

20 Claims, 2 Drawing Sheets

(56) References Cited

OTHER PUBLICATIONS

U.S. Appl. No. 16/855,762, filed Apr. 22, 2020, entitled: RF Level Detection for Desired Channel Among Multiple Broadcast Channels. The Examiner is referred to the copending patent prosecution of the common Applicant (no attachment).

U.S. Appl. No. 16/855,698, filed Apr. 22, 2020, entitled: Smart Adjacent-Channel Indicating/Scanning for FM Modulation. The Examiner is referred to the copending patent prosecution of the common Applicant (no attachment).

* cited by examiner

BANDWIDTH CONTROL IN RADIO FREQUENCY BROADCAST SIGNALS RELATIVE TO ADJACENT-CHANNEL SIGNAL PROPERTIES

Aspects of various embodiments are directed to controlling bandwidth for receiving signals in radio broadcast communications systems, such as those using frequency or amplitude modulation (FM or AM) and including, for example, radio broadcast communications systems in which a desired reception channel is selected for capturing data carried by the FM/AM signal, in the presence of one or more possibly-interfering adjacent channels.

In such broadcast communications systems, accurately receiving and capturing the information provided by the carrier frequency is important. This is often achieved based on a general understanding of the surrounding frequency spectrum and by avoiding overlap and interference from other signals in the adjacent spectrum. Consider such an adjacent signal, for example, in the common radio broadcast systems. In such FM radio systems, for example, interference often occurs from nearby broadcast radio signals (or channels) and the deviation of one of these adjacent broadcast signal may readily interfere with the other. The deviation or sometimes "instantaneous frequency deviation" in such systems may be sometimes referred to as the difference between the frequency of the carrier of the broadcast signal and its center frequency. In order to avoid overlap and interference from adjacent broadcast signals, this deviation may be estimated by measuring and averaging the mono-audio amplitude of the signal associated with the carrier frequency. Other deviation-estimation or tracking approaches may involve use of high-end, commercially-available AC-DC converters, such as the QPD 25-12 Series, to pursue a more stable result but for many such applications, the related expense is excessive.

Reliability for many of these deviation-measurement detectors may depend on the correct bandwidth selection of the measured channel. For some systems, an important consideration may be to ensure that the bandwidth selection of the measured signal has no energy of its adjacent channel and that no signal capture and/or measurement of the desired channel is influenced by any signal which is outside the bandwidth selected for receiving the desired channel. For example, if too narrow of a bandwidth for the measured channel is selected, the detector would indicate low modulation for this channel. Indicating such low modulation would in turn indicate that the bandwidth can be set even narrower. Depending on the used bandwidth control algorithm, this can cause further problems associated with the deviation measurements.

By using digital-signal-processing techniques, approaches for suppressing the adjacent channel have evolved from measuring the distortion in the desired channel to a system where multiple bandwidths are used to determine if a wider setting is allowed. The latter set of systems includes systems that measure distortion in a wider setting than used for audio processing and also systems that use wider bandwidth in combination with more narrow setting to find the energy of the adjacent channel that is near the desired channel.

For those systems using wider bandwidth in combination with a more narrow setting to find adjacent-channel energy, the approach takes into account the level difference of the two channels for predicting the potential distortion. A potential problem with this approach, however, is that the systems can suffer from latch up. When a too small bandwidth is selected the system will erroneously indicate the energy of the desired channel as being the energy of the adjacent channel, leading to a further reduction of the selected bandwidth.

Specific examples of the present disclosure are applicable to the standards imposed by different countries or jurisdictions on such communications systems. In European FM broadcast systems, for example, the channel spacing standard is 100 kHz and the maximum deviation is 75 kHz. This means that between two channels there is a possible overlap of 50 kHz where energy of both channels may reside at any given moment, thereby increasing the likelihood of adjacent channel breakthrough (interfering with the data carried by the desired channel). Again using FM as an example, similar broadcast issues exist in other regions such as in certain Asian regions (e.g., China) and in the USA. In the USA, the channel spacing standard is 200 kHz and the maximum deviation is 150, leading to possible overlap of 100 kHz.

SUMMARY

In accordance with the present disclosure, various example embodiments are directed to issues such as those addressed above and/or as may be apparent from the following disclosure concerning accurate and reliable detection in such broadcasting contexts.

According to one example, the present disclosure is directed to a method and related radio-signal receiver circuitry which discerns accurately and reliably whether energy detected at adjacent channel frequencies correspond to actual broadcast signals, such as FM or AM radio broadcast signals. Such accurate discernment may be used to indicate, as examples, whether there is compliance with RF-communications broadcast criteria and/or to set the signal-receiving bandwidth for a given channel based on whether there is an actual broadcast signal at an adjacent channel.

In another example, a bandwidth setting for the channel of interest (which may be the desired channel) is based on a process in which the circuitry automatically discerns whether the detected energy is associated with a real channel at the selected (e.g., adjacent) channel, or rather energy caused by one or more neighboring channels breaking through ("breakthrough"), based on various signal properties including for example, modulation signal energy from another adjacent channel (e.g., in an FM signal, an average of an MPX signal in combination with peculiar information, such as unexpected (high frequency content) ultra-sonic energy in detected modulation as may be reported by an ultrasonic noise detector.

In yet another example, aspects are directed to FM-radio circuitries and systems, and uses thereof, in which, at the receiving end of an FM broadcast transmission, circuitry is used set the bandwidth and band position for receiving the desired channel of the FM broadcast signal based on measured signal properties of immediately-adjacent channel(s). The adjustments to the received channel include bandwidth selection and offset frequency adjustment. These adjustments are, in part, based on USN signal levels as well as modulation symmetry detection which a affected by the FM modulation level of the desired and other channel(s). FM-signal processing circuitry such as logic/CPU circuitry, then receives the desired channel, including information carried by the FM broadcast signal, in response to setting the bandwidth based on the measured signal properties.

In more particular examples relating to the above process, aspects of the present disclosure are directed to a method and related circuitry are directed to receiving an RF broadcast signal and assessing certain signal properties therefrom with consideration, for example, of indications whether detected/measured energy, at a channel assessed according to a channel spacing (e.g., 100 kHz/200 kHz in FM systems, 9 kHz/10 kHz in AM systems) associated with the RF broadcast, corresponds to: a detected modulation signal in which there is also ultra-sonic energy (e.g., ultra-sonic noise); and/or detecting or discerning that modulation signal energy is from another channel (e.g., one or both channels on the other side of and) adjacent to the assessed channel.

In a more specific example related to the above method and circuitry, an ultrasonic noise (USN) detection circuit may be used for processing the detected modulation signal, for example, in the form of a demodulated version of the RF signal. This demodulated version of the RF signal would contain or indicate whether there is ultra-sonic energy (e.g., ultra-sonic noise) in the assessed channel which is possibly due to energy in one or both of the channels immediately adjacent to the assessed channel. Further, a modulation symmetry detection circuit may be used for the detection (or discernment) that modulation-signal energy is from another channel (e.g., one or both channels on the other side of) the assessed channel.

In yet another more-specific example, in addition to use of such USN detection and modulation symmetry detection circuitry, further aspects are directed to use of a level-detection circuit to assess relative differences in modulation-signal strength for the assessed channel ("first adjacent-channel"). In further-specific examples, signal processing circuitry is used to work through a logical/decision tree, based on the operations of these above-noted circuits, to discern and indicate whether the detected energy for the first adjacent channel corresponds to energy of an actual broadcast signal corresponding to such a radio broadcast signal, or whether the detected energy in the first adjacent channel corresponds to energy caused by modulation in one or both channels on either side of the first adjacent-channel. As may become apparent, such accurate and reliable discernment may be important for many applications in which setting the bandwidth for the desired channel needs to be accurately set relative to energy-related parameters of the adjacent channel(s), to circuit-caused anomalies of the RF receiver, and/or over-modulation of the adjacent channel(s).

In another specific example involving FM broadcasts in which a demodulated (e.g., MPX) signal may contain the audio carried by the FM, various parts of the demodulated signal may be processed by signal processing circuitry to generate an offset adjustment to the IF mixer frequency. In a more particular related example, ultrasonic noise (USN) is detected in the demodulated signal, relative to a threshold level (which may be initially set, e.g., via empirical data), and this adjustment is used to move the center of the receiver's bandpass filter away from the offending adjacent channel breakthrough. To assist in the generation of an offset, an adjustable threshold, may be used for determining USN levels.

The above discussion/summary is not intended to describe each embodiment or every implementation of the present disclosure. The figures and detailed description that follow also exemplify various embodiments.

BRIEF DESCRIPTION OF FIGURES

Various example embodiments may be more completely understood in consideration of the following detailed description in connection with the accompanying drawings, in which.

Figure 1:
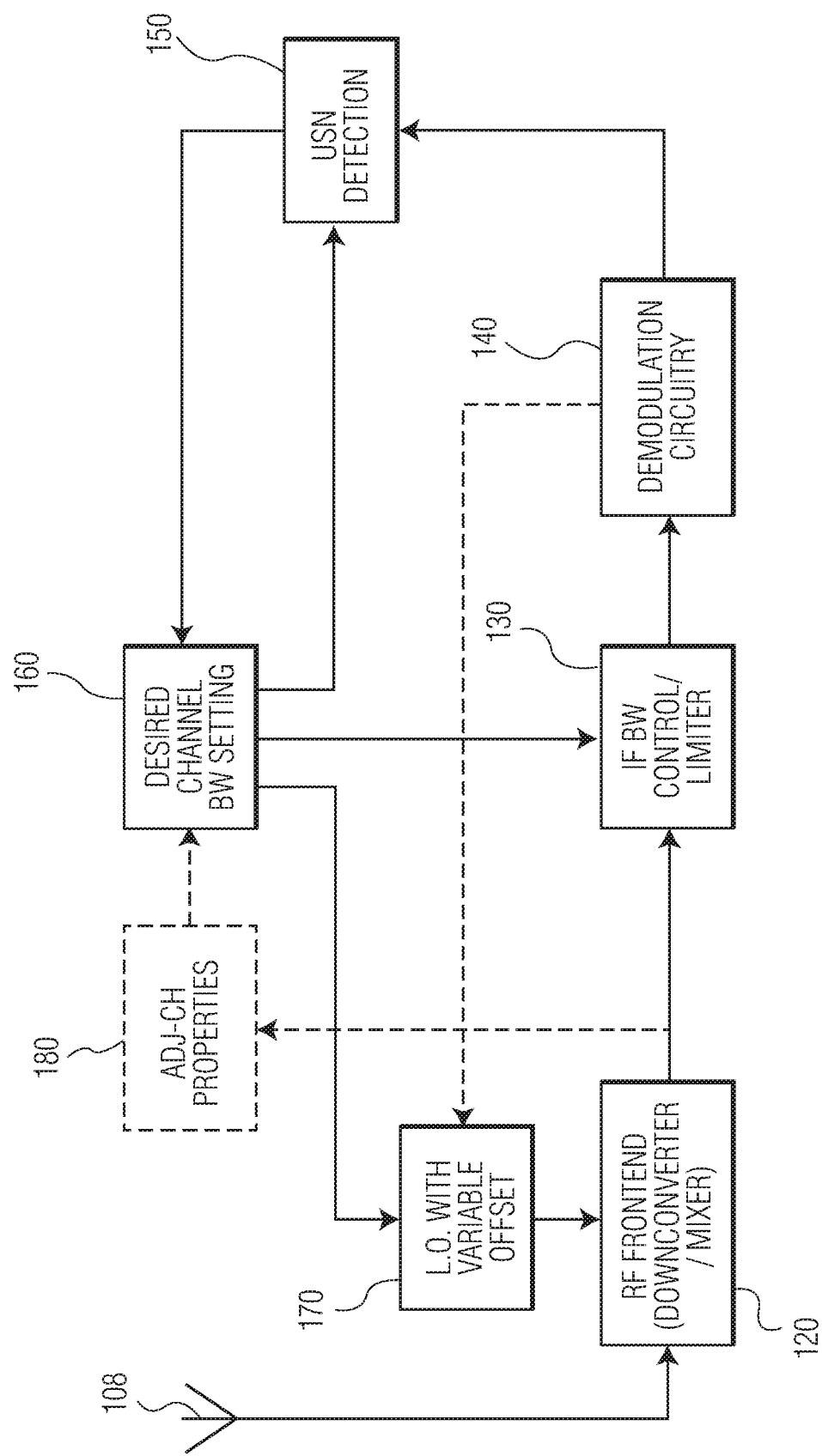
FIG. 1 is a circuit-based block diagram of radio-frequency (RF) radio reception circuitry such as in an RF receiver for FM illustrating an example bandwidth/position adjustment apparatus, in accordance with the present disclosure.

While various embodiments discussed herein are amenable to modifications and alternative forms, aspects thereof have been shown by way of example in the drawings and will be described in detail. It should be understood, however, that the intention is not to limit the disclosure to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are believed to be applicable to a variety of different types of apparatuses, systems and methods involving reception and/or processing of a desired channel or signal ensuing from a radio broadcast transmission. This type of transmission may occur, for example, by way of the broadcasting from radio transmitters operated on behalf of publically-broadcast FM and AM radio stations. While aspects of the present disclosure have been shown to be beneficial when used in the context of such radio broadcast signals and while the following discussion uses specific FM-type RF signals as examples to understand such aspects, the present disclosure is not necessarily so limited.

Accordingly, in the following description various specific details are set forth to describe specific examples presented herein. It should be apparent to one skilled in the art, however, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element. Also, although aspects and features may in some cases be described in individual figures, it will be appreciated that features from one figure or embodiment can be combined with features of another figure or embodiment even though the combination is not explicitly shown or explicitly described as a combination.

In specific examples according to the present disclosure, embodiments involve processing a radio broadcast signal (e.g., as received via an FM/AM broadcast transmission) in a frequency spectrum having separable segments respectively corresponding to different channels associated with the broadcast radio signals. As is conventional, the information relevant to the broadcast is carried by modulating a carrier signal, sometimes the desired signal or channel; this desired channel may be typically selected by setting the bandwidth known, from historical or empirical evidence, to correspond to the frequency of the carrier signal and to avoid interference energy from adjacent channels. As noted previously, however, it is often a challenge to select the proper range for this bandwidth so that only the energy of the desired channel is captured. In the case where an information (e.g., audio) channel is only being demodulated to determine the signal properties of the channel, it is not required to construct good, or undistorted, audio quality. In connection with the present disclosure and for certain example embodiments, it has been discovered that such proper bandwidth range selection can be realized by measuring signal properties of one or both channels immediately adjacent to the desired channel and effecting the setting (to select the proper range for this desired bandwidth) based on the modulation of the immediately-adjacent channel(s). The larger the measured level modulation measured on the adjacent channel(s), the more narrow the bandwidth of the desired channel is to be set. Various methods can be used to adjust the bandwidth but they can suffer from two issues: a) if the bandwidth becomes too narrow, the demodulated signal can suffer distortion; b) if the bandwidth becomes too narrow the adjustment circuitry may misinterpret the signal as showing an adjacent channel breaking through the channel of interest, and then incorrectly further reducing the bandwidth which can lead to latch up (wanted modulation is outside the bandwidth of the filter).

According to another important aspect, the present disclosure is directed to a specific example involving such radio circuitry as noted above and in which an ultrasonic noise (USN) detection circuit is used for processing the detected modulation signal, for example, in the form of a demodulated version of the RF signal (e.g., MPX signal in an FM example for a signal that contains the audio carried by the modulation). This demodulated version of the RF signal would contain or indicate whether there is ultra-sonic energy (e.g., ultra-sonic noise) in the assessed channel which is possibly due to energy in one or both of the channels immediately adjacent to the assessed channel. As an example, the USN detection circuit may be configured to report unexpected high frequency content or some other specific attribute of ultra-sonic energy in detected modulation (e.g., as may be identified by a notch filter and/or high pass filter circuits). Further, a modulation symmetry detection circuit may be used for the detection (or discernment) that modulation-signal energy is from another channel (e.g., one or both channels on the other side of) the assessed channel.

In specific respective examples, this setting for the desired bandwidth may be adjusted without concern for demodulated signal distortion. The relaxation of distortion requirements allows for an offset of the IF frequency mix to be adjusted to move the carrier frequency further away from the adjacent channel breakthrough. Note that the allowable adjustment to the IF frequency mix should only span a range that keeps the carrier frequency within the selected bandwidth. In certain contexts, being within the band for a specified channel may correspond to no further than up to the −3 dB edges of the bandpass filter (e.g., relative to the channel's center frequency).

In the above type of example involving FM radio broadcasts, the IF mixing frequency offset may be based on a measurement from a (frequency) modulation symmetry detector. For certain embodiments receiving this type of broadcast, the modulation symmetry detector measures the received signal energy below the carrier frequency and subtracts this from the energy above the carrier frequency. One of three conditions can come from the subtraction: a) the subtraction yields a number close to zero which implies the band is symmetric or no breakthrough into the channel; b) the subtraction yields a large negative number which implies there is breakthrough into the channel from the lower frequency side; and c) the subtraction yields a large positive number which implies there is breakthrough into the channel from the higher frequency side. From these conditions, the IF mix frequency offset can be adjusted to move away from the offending adjacent channel thereby reducing the energy on this side of the received signal. For example, in the above case where the subtraction yields a large negative number, the disturbance involves the lower frequency and thus the mixing frequency should be set higher, and vice versa for the last of the above three cases.

Further, in this type of example the adjustment of the received bandwidth may be determined by a measure of the ultra-sonic noise (USN) energy. A narrower bandwidth allows for more energy from the USN. For wider bandwidths the allowed USN is lower. In certain implementations of the examples of the immediately-preceding discussion, a variable USN threshold may be based in part on the selected bandwidth, and with the threshold and bandwidth adjusted/set accordingly. The USN is compared to this threshold, and then an appropriate adjustment can be again made to the bandwidth. This variable threshold may be used to mitigate the occurrence of latch up.

Now turning to the figures, with reference to FIG. 1 and relating to the above-disclosed example aspects and embodiments, FIG. 1 illustrates an example of FM radio receiver circuitry showing a specific approach for providing bandwidth control for measuring properties of a desired channel, consistent with some of the above-discussed aspects and features including measurement of and reliance on measured properties adjacent channels (e.g., first contiguously adjacent channel on one side of the desired channel). It will be appreciated, however, that other circuits (and/or radio signal types) may also be used.

In the example of FIG. 1, a circuit-based FM radio-channel receiver, in accordance with the present disclosure, includes an antenna 108, which is connected to an RF frontend 120. The RF frontend circuitry processes signals from the antenna. This circuitry may include other more conventional circuits such as amplifiers, power supplies, pre-filters, etc. that are not relevant for purposes of this discussion. One part of this RF frontend 120 is an IF mixer to control the position of the carrier frequency within the selected output bandwidth. The IF mixer is controlled by a local oscillator (or "LO") which is part of circuit 170 and which has an adjustable frequency that is controlled by a variable offset circuit also in circuit 170.

In more specific examples, the LO may be controlled by a modulation symmetry (or "offset detector", not separately illustrated) which may be separated or integrated within the circuit 170 or another circuit in FIG. 1, for processing the received RF signal after being demodulated. In one such example, where an adjacent channel on the positive side has a breakthrough into the channel, the offset detector measures a relatively large positive value instead of the normally-output value; consequently, the average of the signal (which is normally '0' for a signal) becomes positive, thereby biasing or shifting to the positive side. To reduce this effect the center frequency, circuit 170 uses the output of the offset detector to counteract by shifting to the negative side. In this manner and with this the amount of breakthrough being reduced and the amount of energy on the other side being increased, more negative modulation will fall within the bandwidth and a new balance is found. In a particular implementation, this unbalance-detection function may be implemented as any of various circuits to provide an indication or measurement of symmetry. Using the FM example, normal FM signals are symmetrical around '0' in the modulated values, and therefore an offset to this symmetry indicates something is wrong.

In a more specific embodiment, the circuit 170 may be implemented to receive and be influenced by the demodulated signal based at least in part on a level of USN detection. As is exemplified in connection with the figures, this may involve feedback from the USN detection to an RF-signal mixer (e.g., as in FIG. 1, via a local oscillator having a variable offset, and as in FIG. 2, via logic (control) circuitry assessing the USN using feedback in the demodulated signal). The demodulated signal may be provided via a first-order low pass filter with a cut off frequency below the audio spectrum and sufficient to ignore lower-frequency audio content which may otherwise indicate an adjacent channel breakthrough. For example, in an FM system the full audio range is often used for optimal audio perception and with such low-frequency audio being part of the signal. In general and as merely examples, the cut-off may be below 20 Hz, such as 3 Hz, as may be convenient given the applicable circuitry used in the system. For example, the positive and negative values (applying a dead zone) may be split, and then the positive and the negative energy levels are averaged and then compared to indicate whether there is an imbalance.

The mixed signal from the RF frontend 120 is applied to the IF BW control/limiter (or limiter) 130. The limiter 130 applies a bandpass filter to the signal so as to allow for measurements in only the desired frequency band. Further, the limiter 130 can be adjusted for bandwidth via the desired channel bandwidth setting circuitry 160. The specific internal circuitry of the limiter 130 may also be configured to limit the extent of the requested adjustment so as to direct or keep the carrier frequency within the −3 dB lower and upper edges of the bandpass filter.

In this above type of example, the bandwidth filtered signal from the limiter 130 is passed to the demodulation circuitry 140 which applies standard radio practices to extract the transmitted signals included in the FM transmitted signal. The signal from the demodulation circuitry 140 is then passed to a USN detection circuit 150. The USN detection circuit 150 is configured to measure the energy level of the ultra-sonic noise included in the selected bandwidth, and this is in response to an input from a BW-setting circuit 160 which is used to set the bandwidth ("BW")) for the desired channel. This input from the BW-setting circuit 160 is used in the USN detection circuitry 150 to adjust a threshold value. This threshold value is used by one or more applicable algorithms within, and/or provided for control to, the USN detection 150 to make a determination if the output signal of 150 should indicate either high, low, or medium USN level. For example, one algorithm may provide the bandwidth setting so that it is set relatively low concurrent with an adjustment of the variable noise-level threshold to permit for a greater level of ultra-sonic energy, and the bandwidth setting may be set relatively high when the variable noise-level threshold is not adjusted to permit for a greater level of ultra-sonic energy. In this instance, the bandwidth setting may be relatively low to coincide with the greater level of ultra-sonic energy being permitted, and the bandwidth setting being relatively high may coincide with a lower level of ultra-sonic energy being permitted.

The selection of a particular algorithm in this context, may depend on what other signal properties are being taken into account. As an example, such signal properties may include energy measurements associated with peak/average amplitudes of energy (e.g., at an IF stage before demodulation and/or after demodulation) in one or both channels adjacent to the channel of interest. In other examples, the bandwidth setting is controlled to avoid or mitigate a latchup condition (e.g., if the bandwidth setting is too narrow, susceptibility to a latchup condition is high), and to avoid or mitigate too high a setting for the bandwidth which makes the channel more susceptible to an adjacent-channel breakthrough condition (where energy of a channel adjacent to the desired channel breaks through and interferes with the desired channel).

In a specific example implementation, the USN detection circuitry 150 includes a high pass filter, followed by an absolute-energy detector which provides an output that is averaged via a quasi-peak detector. In this manner, the USN detection implements high pass filtering circuitry to select the required bandwidth and then detect the energy in this selected band.

In yet another example, the bandwidth setting is set relatively low concurrent with an adjustment of the variable noise-level threshold to permit for a greater level of ultra-sonic energy, and the bandwidth setting is set relatively high when the variable noise-level threshold is not adjusted to permit for a greater level of ultra-sonic energy. In this manner, the bandwidth setting being relatively low coincides with the greater level of ultra-sonic energy being permitted, and the bandwidth setting being relatively high coincides with a lower level of ultra-sonic energy being permitted.

By the selected algorithm taking these factors and/or properties into account and/or setting or adjusting the USN threshold as described above, the bandwidth setting may be set to realize various advantages. As one example, by carefully controlling the bandwidth setting, a greater level of ultra-sonic energy may be permitted and likelihood of a latchup condition may be to mitigated or prevented. It is appreciated that the above exemplary algorithms may be used in combination or in the alternative when accounting for such other factors/properties.

Also in connection with the example of FIG. 1, the BW-setting circuit 160 may receive as inputs, a signal from the USN detection circuitry 150 as well as data from circuitry 180 which is used to adjust channel properties. In response to these inputs, the BW-setting circuit 160 generates (or outputs) data to three circuitry blocks: the USN detection 150, the limiter 130, and the local oscillator with the circuit 170. The BW-setting circuit 160 may also use its inputs to calculate (or look up if the data is prestored in a memory circuit via a lookup table) a bandwidth that is appropriate for the current set of inputs. As an example for how the bandwidth may be controlled, the BW-setting circuit 160 may request a decrease of the bandwidth from the limiter 130 if the USN detection circuitry 150 signal indicates a large signal strength, relative to the adjustable threshold, and conversely, request an increase of the bandwidth from the limiter 130 if the USN detection circuitry 150 signal indicates a small signal strength, relative to the adjustable threshold.

Continuing with this example, the BW-setting circuit 160 is configured to output a control signal to the limiter 130 which adjust may adjust a bandpass filter (not illustrated in FIG. 1) to control bandwidth as exemplified above.

The BW-setting circuit 160 may also generate and send a signal to the local oscillator with the (variable LO) circuit 170, so prompt or cause the circuit 170 to adjust the local oscillator, and therein moving the position of the received FM channel carrier frequency up or down in the IF band. As discussed further in FIG. 2 below, this signal provided from circuitry 180 (which is to adjust channel properties to the BW-setting circuit 160) may be used for providing more information about signal properties which, in turn, may be used for a more optimal selection of the algorithm and/or setting for the bandwidth of the channel of interest.

Figure 2:
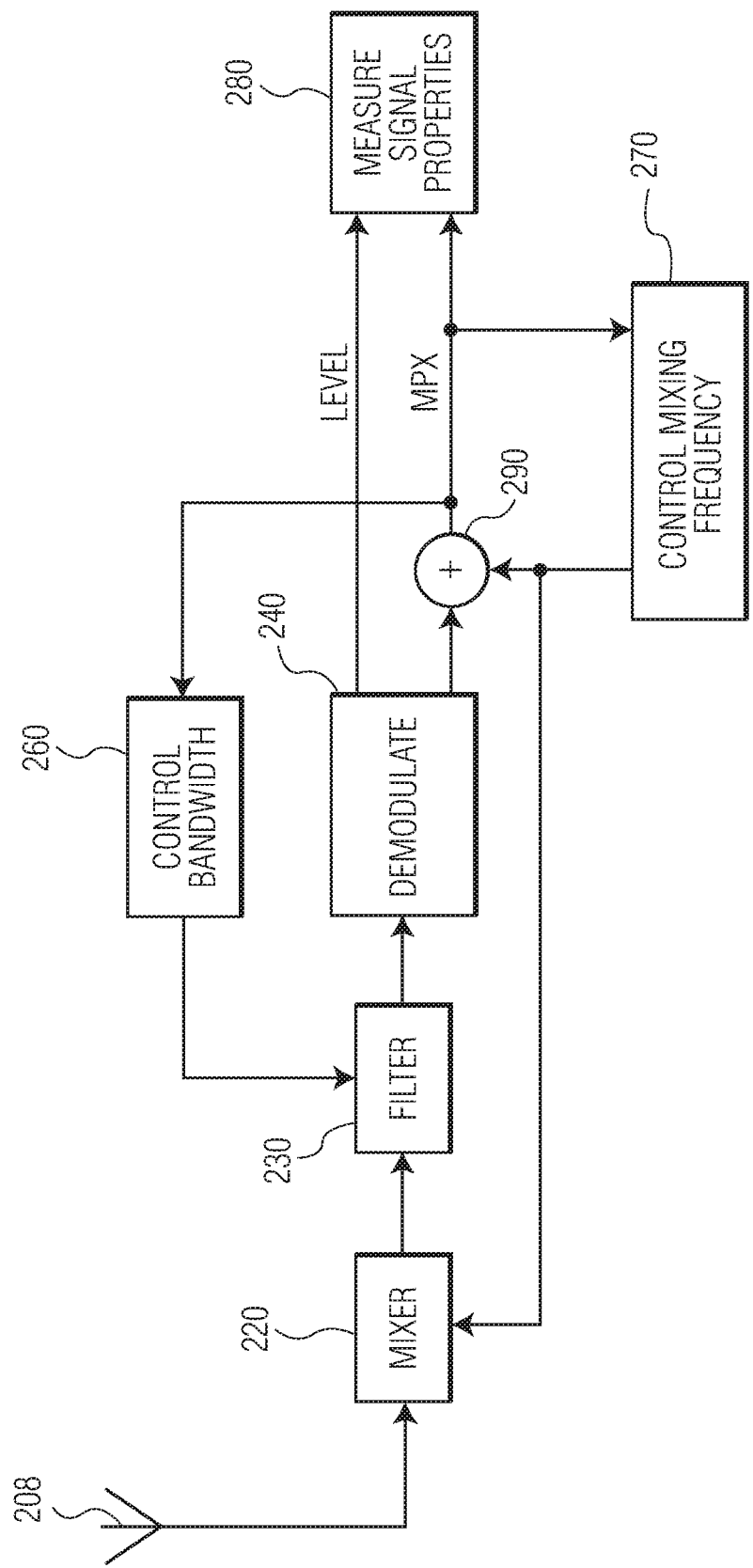
FIG. 2 is another circuit-based block diagram showing another example illustrating bandwidth/position adjustment apparatus in accordance with the present disclosure.

FIG. 2 illustrates another example method and related circuitry, also in accordance with aspects of the present disclosure, for processing a received radio signal and relevant channel properties. Many aspects of FIG. 2 are similar to related aspects in FIG. 1, and similar reference numbers are used accordingly; for example, the reference numerals 108, 120, 130, 140, 160, 170, and 180 (as used in FIG. 1) respectively relate to the following reference numerals of FIGS. 2: 208, 220, 230, 240, 260, 270, and 280, with the last two digits of reference numerals from corresponding sets being the same to show that the related blocks may be implemented in similar manners and/or implemented to carry out similar activities.

Continuing with this example, signals from the demodulator and signals from a control/mixing circuitry 270 are combined at a combiner circuit 290. The combiner circuit 290 is to compensate for distortion in the signal due the mixer frequency offset which is generated by the control/mixing circuitry 270 and by applying the signal, but inverted, to the incoming received signal in the mixer 220, so as to subtract or cancel out the distortion. In connection with such a FM receiver in which an MPX signal is available in this regard, the MPX signal may be used as an input signal to a (signal-properties measurement) circuitry 280. A signal level measurement is also generated in the demodulator 240 and sent to the circuitry 280. These two input signals to the circuitry 280 are used to create a measure of the signal properties such as, for example, the presences of a breakthrough adjacent channel. These measured properties and be used to, for example, display the signal properties on a measuring device, or to send control signal to further circuitry to assist FM or AM scanning functions. As the MPX signal is created by averaging the received MPX signal, therefore it changes slowly. Changing this signal slowly minimized distortion caused by adjustments made to the system.

Now turning to the control/mixing circuitry 270, in this example of FIG. 2; this circuitry takes the MPX signal from the combiner circuit 290, as described above, and from this generates a frequency offset signal to be sent to the mixer 220. This parameters for generating the offset may be based, in part, on various parts or properties of the MPX signal such a USN signal, a measure of the bandwidth modulation symmetry detection, etc. For example, the MPX signal may be spectrally balanced (e.g., with the same signal level on upper half of the band as there is on the lower half of the band). For example, if the lower half has a higher signal than the upper half, then there may be a breakthrough channel transmission in the lower adjacent channel. In this case, the frequency offset may be adjusted to cause the mixer to shift the range of the bandpass filter to pass signals at a slightly higher frequency range (e.g., by one third to a few percent) and thereby avoid the lower frequency breakthrough. The signal properties may be continuously or regularly monitored with such feedback provided for continuous or periodic adjustment.

Continuing with this FM-type example, the USN signal may be used to control the bandwidth as follows: when the USN signal is large, as measured against a scaled signal level input, it indicates that there is adjacent channel breakthrough in the current bandwidth. In this case the bandwidth could be adjusted to a narrower bandwidth. When the USN signal is small, as measured against a scaled signal level input, it indicates that there is little or no adjacent channel breakthrough in the current bandwidth. In this case the bandwidth could be adjusted to a wider bandwidth.

Accordingly, each of the examples shown in FIGS. 1 and 2 depict signal flow along a forward signal path from an antenna at the frontend left side of the illustration to the right side and with a feedback path tapping into the forward signal path for the circuit-based activities (or steps) associated with such noted aspects as detecting properties, setting the bandwidth, and adjusting the USN threshold.

Terms to exemplify orientation, such as upper/lower, left/right, top/bottom and above/below, may be used herein to refer to relative positions of elements as shown in the figures. It should be understood that the terminology is used for notational convenience only and that in actual use the disclosed structures may be oriented different from the orientation shown in the figures. Thus, the terms should not be construed in a limiting manner.

The skilled artisan would recognize that various terminology as used in the Specification (including claims) connote a plain meaning in the art unless otherwise indicated. As examples, the Specification describes and/or illustrates aspects useful for implementing the claimed disclosure by way of various circuits or circuitry which may be illustrated as or using terms such as blocks, modules, device, system, unit, controller, and/or other circuit-type depictions (e.g., reference numerals 160 and 180 depict a such a circuit as a block/module and as described herein). Such circuits or circuitry are used together with other elements to exemplify how certain embodiments may be carried out in the form or structures, steps, functions, operations, activities, etc. As another example, where the Specification may make reference to a "first [type of structure]", a "second [type of structure]", etc., where the [type of structure] might be replaced with terms such as ["circuit", "circuitry" and others], the adjectives "first" and "second" are not used to connote any description of the structure or to provide any substantive meaning; rather, such adjectives are merely used for English-language antecedence to differentiate one such similarly-named structure from another similarly-named structure (e.g., "first circuit to convert . . . " is interpreted as "circuit to convert . . . ").

Based upon the above discussion and illustrations, those skilled in the art will readily recognize that various modifications and changes may be made to the various embodiments without strictly following the exemplary embodiments and applications illustrated and described herein. For example, methods as exemplified in the Figures may involve steps carried out in various orders, with one or more aspects of the embodiments herein retained, or may involve fewer or more steps. Such modifications do not depart from the true spirit and scope of various aspects of the disclosure, including aspects set forth in the claims

What is claimed is:

1. A method comprising:
   downconverting, in response to a feedback signal, a modulated broadcast signal from a desired channel from among a plurality of broadcast channels to have a fixed channel spacing, to provide a downconverted signal;
   in demodulated energy corresponding to the downconverted signal, detecting a level of ultra-sonic energy relative to a variable noise-level threshold, and based at least in part on the ultra-sonic energy, providing the feedback signal;

setting a bandwidth for receiving the desired channel relative to signal properties of channel energy that is immediately adjacent to the desired channel; and adjusting the variable noise-level threshold based at least in part on the bandwidth setting for receiving the desired channel.

2. The method of claim 1, wherein the bandwidth setting for receiving the desired channel, if too narrow, is susceptible to a latchup condition associated with an excessively-narrow setting for the bandwidth, and if too wide, is susceptible to energy of a channel adjacent to the desired channel breaking through, or an adjacent-channel breakthrough condition.

3. The method of claim 1, wherein the bandwidth setting is set relatively low concurrent with an adjustment of the variable noise-level threshold to permit for a greater level of ultra-sonic energy, and the bandwidth setting is set relatively high when the variable noise-level threshold is not adjusted to permit for a greater level of ultra-sonic energy, whereby the bandwidth setting being relatively low coincides with the greater level of ultra-sonic energy being permitted, and the bandwidth setting being relatively high coincides with a lower level of ultra-sonic energy being permitted.

4. The method of claim 1, further including reducing the bandwidth setting to permit for a greater level of ultra-sonic energy and to mitigate or prevent likelihood of a latchup condition associated with an excessively narrow setting for the bandwidth.

5. The method of claim 1, further including using circuitry to limit variance of a mixing frequency used for said downconverting such that the bandwidth set for receiving the desired channel results, during steady state operation, always captures energy associated with a carrier frequency of the desired channel.

6. The method of claim 1, wherein said adjusting the variable noise-level threshold based at least in part on the bandwidth setting for receiving the desired channel causes distortion in an audio signal carried by the broadcast signal, and wherein the modulated broadcast signal is a frequency modulated (FM) broadcast signal, and further including providing an MPX signal including an audio signal, based on demodulation of a signal corresponding to the downconverted FM broadcast signal, wherein the demodulation of the corresponding signal mitigates the distortion.

7. The method of claim 1, further including demodulation circuitry providing an MPX signal, wherein the modulated broadcast signal is a frequency modulated (FM) broadcast signal, wherein said steps of downconverting and detecting are respectively performed in series along a signal path defining signal flow emanating from an antenna and towards and through the demodulation circuitry, wherein said steps of detecting, setting, and adjusting are part of a feedback path from the signal path, and wherein the feedback signal has a frequency that varies based at least in part on a modulation imbalance of the demodulated energy.

8. The method of claim 1, wherein the modulated broadcast signal is a frequency modulated (FM) broadcast signal, and further including demodulation circuitry providing an MPX signal, and performing said steps of downconverting and detecting respectively in series along a forward signal path which defines signal flow emanating from an antenna and towards and through the demodulation circuitry, and further including adjusting the feedback signal in response to the detected level of ultra-sonic energy.

9. A method comprising:
downconverting, in response to a feedback signal, a modulated broadcast signal from a desired channel from among a plurality of broadcast channels to have a fixed channel spacing, to provide a downconverted signal;

in demodulated energy corresponding to the downconverted signal, detecting a level of ultra-sonic energy relative to a variable noise-level threshold and discerning therefrom and from signal properties of channel energy that is immediately adjacent to the desired channel whether there exists a channel breakthrough condition.

10. The method of claim 9, further including adjusting the variable noise-level threshold based at least in part on a bandwidth setting for receiving the desired channel.

11. An apparatus comprising:
a circuit to downconvert, in response to a feedback signal, a modulated broadcast signal from a desired channel from among a plurality of broadcast channels to have a fixed channel spacing, and to provide a downconverted signal;

a circuit to detect, in demodulated energy corresponding to the downconverted signal, a level of ultra-sonic energy relative to a variable noise-level threshold, and based at least in part on the ultra-sonic energy, providing the feedback signal;

a circuit to set a bandwidth for receiving the desired channel relative to signal properties of channel energy that is immediately adjacent to the desired channel; and a circuit to adjust the variable noise-level threshold based at least in part on the bandwidth setting for receiving the desired channel.

12. The apparatus of claim 11, wherein the bandwidth setting for receiving the desired channel, if too narrow, is susceptible to a latchup condition associated with an excessively-narrow setting for the bandwidth, and if too wide, is susceptible to energy of a channel adjacent to the desired channel breaking through, or an adjacent-channel breakthrough condition, and wherein the modulated broadcast signal is one of a frequency modulated broadcast signal and an amplitude modulated broadcast signal, wherein the circuit to downconvert includes a mixer and the feedback is provided to the mixer as a variable signal.

13. The apparatus of claim 11, wherein the bandwidth setting is set relatively low concurrent with an adjustment of the variable noise-level threshold to permit for a greater level of ultra-sonic energy, and the bandwidth setting is set relatively high when the variable noise-level threshold is not adjusted to permit for a greater level of ultra-sonic energy, whereby the bandwidth setting being relatively low coincides with the greater level of ultra-sonic energy being permitted, and the bandwidth setting being relatively high coincides with a lower level of ultra-sonic energy being permitted.

14. The apparatus of claim 11, further including circuitry to reduce the bandwidth setting to permit for a greater level of ultra-sonic energy and to mitigate or prevent likelihood of a latchup condition associated with an excessively narrow setting for the bandwidth.

15. The apparatus of claim 11, further including circuitry to limit variance of a mixing frequency used for said downconverting such that the bandwidth set for receiving the desired channel results, during steady state operation, is configured to capture energy associated with a carrier frequency of the desired channel.

16. The apparatus of claim 11, wherein the circuit to adjust the variable noise-level threshold is based at least in part on the bandwidth setting for receiving the desired channel causes distortion in an audio signal carried by the broadcast signal.

17. The apparatus of claim 16, wherein the modulated broadcast signal is a frequency modulated (FM) broadcast signal, and further including demodulation circuitry to provide an MPX signal including an audio signal, based on demodulation of a signal corresponding to the downconverted FM broadcast signal and on the feedback signal being variable, wherein the demodulation of the corresponding signal is to mitigate the distortion.

18. The apparatus of claim 11, further including demodulation circuitry to provide an MPX signal, wherein said steps of downconverting and detecting are respectively performed in series along a signal path defining signal flow emanating from an antenna and towards and through the demodulation circuitry.

19. The apparatus of claim 18, further including the demodulation circuitry to provide a signal corresponding to the demodulated energy, wherein the feedback signal has a varying frequency, based at least in part of a modulation imbalance of the demodulated energy corresponding to the downconverted signal.

20. The apparatus of claim 11, further including a circuit to adjust the feedback signal in response to the detected level of ultra-sonic energy.

\* \* \* \* \*